United States Patent [19]

Cardello

[11] Patent Number: 6,104,098
[45] Date of Patent: Aug. 15, 2000

[54] APPARATUS FOR CONTROLLING MOBILE EQUIPMENT

[75] Inventor: Paul S. Cardello, 69 Roberts Rd., Newtown Square, Pa. 19073

[73] Assignee: Paul S. Cardello, Newtown Square, Pa.

[21] Appl. No.: 09/113,717

[22] Filed: Jul. 10, 1998

Related U.S. Application Data

[63] Continuation-in-part of application No. 08/738,974, Oct. 24, 1996, Pat. No. 5,780,936.

[51] Int. Cl.$^7$ ................................................... B66C 23/84
[52] U.S. Cl. ............................ 307/9.1; 212/277; 212/279; 212/302; 187/232; 83/471.2; 83/471.3
[58] Field of Search .............................. 307/9.1; 212/277, 212/279, 302; 187/232; 83/471.2, 471.3

[56] References Cited

U.S. PATENT DOCUMENTS

| | | |
|---|---|---|
| 3,620,270 | 11/1971 | Jureit . |
| 3,638,211 | 1/1972 | Sanchez . |
| 3,650,216 | 3/1972 | Harwick et al. . |
| 3,848,750 | 11/1974 | Hoge . |
| 4,068,414 | 1/1978 | Breitenstein et al. . |
| 4,089,388 | 5/1978 | Johnson . |
| 4,286,417 | 9/1981 | Shelton . |
| 4,627,227 | 12/1986 | Dixon . |
| 4,850,787 | 7/1989 | Yoneda . |
| 4,941,546 | 7/1990 | Nist et al. . |
| 5,490,755 | 2/1996 | Billotte . |
| 5,780,936 | 7/1998 | Cardello ................................ 307/9.1 |

FOREIGN PATENT DOCUMENTS

| | | |
|---|---|---|
| 2 286 303 | 9/1995 | United Kingdom . |
| WO 94/03779 | 2/1994 | WIPO . |

*Primary Examiner*—Albert W. Paladini
*Attorney, Agent, or Firm*—Ratner & Prestia

[57] ABSTRACT

Apparatus for controlling the rotational movement of a ladder or the like of mobile equipment having stabilizing outriggers when the ladder is rotated manually to the side of the mobile equipment which does not have the outrigger fully deployed. A two-part switch, arranged for one part to rotate relative to the other, develops various combinations of signals dependent upon the relative positions of the parts of the switch. A control circuit is arranged to recognize the positions of the switch parts and supplies control signals which allow the ladder to rotate at a particular rate and to a particular point as the operator is steering the ladder to the side of the mobile equipment at which the outrigger is not fully deployed.

14 Claims, 4 Drawing Sheets

APPARATUS FOR CONTROLLING MOBILE EQUIPMENT

This application is a continuation-in-part of Ser. No. 08/738,974, filed Oct. 24, 1996, which is U.S. Pat. No. 5,780,936 issued on Jul. 14, 1998.

TECHNICAL FIELD

The present invention relates, in general, to mobile equipment such as fire fighting and utility service vehicles having extendable ladders, "cherry-pickers" and the like and, in particular, to apparatus for controlling the movement of such mobile equipment ladders, "cherry-pickers" and the like.

BACKGROUND OF THE INVENTION

Fire fighting vehicles with long extension ladders are equipped with outriggers on each side which are extended outwardly to provide stability when the ladders are raised, extended and rotated and the center of gravity of the ladder and the weight carried by the ladder is outward of the side of the fire fighting vehicle. With the outriggers fully deployed, the raised, extended ladder can be rotated to a desired position by an operator in the carriage at the top of the ladder and/or an operator at the base of the ladder. The fire fighting vehicle is designed so that the ladder can be safely operated within the design range and load limitations with the outriggers fully deployed.

Typically, the controls for rotating the ladder have an interlock which prevents rotating the ladder unless the outriggers have been fully deployed but which can be bypassed when the available space does not permit full deployment of the outriggers and the situation requires rotating the ladder. The operator simply actuates a manual over-ride switch which permits manual control of rotating the ladder to the desired position even with the outriggers not fully extended. Such arrangements place complete judgment and control of the rotation of the ladder with the operator which can lead to serious accidents. For example, if the ladder is rotated to a side where the outrigger is not fully extended, shifting the center of gravity can cause the fire fighting vehicle to capsize. The same result can occur if the rotating ladder approaches a side where the outrigger is not fully deployed at a high rate of rotational speed and is suddenly stopped.

To overcome this shortcoming of manual control of rotation of the ladder, it has been suggested to incorporate a control feature by which the operator is assisted during the manual control of the ladder. By sensing the rotation of the ladder during manual control operation with, for example, proximity switches and target plates, the direction of rotation and the approach to various critical points can be sensed, so that the ladder will be rotated only in the direction of an extended outrigger and the rate of rotational movement of the ladder can be reduced to prevent overshooting the critical point. In effect, manual control of the rotational movement of the ladder is over-ridden.

Proximity switches and target plates have been unsatisfactory in that the water being applied to fight a fire and debris affect the condition and operation of such devices. During cold weather when the water turns to ice, proximity switches and target plates can lock. In addition, proximity switches and target plates are difficult to install and calibrate.

SUMMARY OF THE INVENTION

Apparatus for controlling the rotational movement of a ladder of a vehicle having extendable outriggers at the lateral sides of the vehicle constructed in accordance with the present invention includes sensing means responsive to movement of the outriggers for developing outrigger signals representative of full deployment of the outriggers. Also included in this apparatus is a swivel unit, including a first switch member and a second switch member mounted for relative rotation between the first switch member and the second switch member. Input signals are supplied to the swivel unit from which first output signals are delivered for a first range of rotational positions of the second switch member relative to the first switch member, and second output signals are delivered for a second range of rotational positions, extending beyond the first range of rotational positions, of the second switch member relative to the first switch member. The apparatus further includes a control unit responsive to the outrigger signals and the output signals delivered from the swivel unit for supplying control signals to a driver unit which allows rotation of the ladder.

A rotation position sensor unit, constructed in accordance with the present invention, includes a first multi-segment ring having a first electrically conductive segment extending over a first arc length and to which a first input signal is supplied and a second electrically conductive segment extending over a second arc length and to which a second input signal is supplied. The first electrically conductive segment and the second electrically conductive segment are electrically isolated. The rotation position sensor unit also includes a second ring from which output signals are delivered. The second ring has first, second, and third electrical contacts each electrically isolated from the others. The first and second electrical contacts are positioned on the second ring for: (1) contact of the first electrical contact with the second electrically conductive segment of the first multi-segment ring and contact of the second electrical contact with the second electrically conductive segment of the first multi-segment ring for a first range of rotational positions of the second ring relative to the first multi-segment ring, and (2) contact of the first electrical contact with the first electrically conductive segment of the first multi-segment ring and contact of the second electrical contact with the second electrically conductive segment of the first multi-segment ring for a second range of rotational positions, extending beyond the first range of rotational positions, of the second ring relative to the first multi-segment ring. The third electrical contact is positioned on the second ring for: (1) contact of the third electrical contact with the second electrically conductive segment of the first multi-segment ring for the first range of rotational positions of the second ring relative to the first multi-segment ring; and (2) contact of the third electrical contact with the second electrically conductive segment of the first multi-segment ring for the second range of rotational positions of the second ring relative to the first multi-segment ring. The rotation position sensor further includes means for mounting the first multi-segment ring and the second electrically conductive ring for relative rotation between the first multi-segment ring and the second ring.

Although the invention will be described in connection with the rotation of ladders of fire fighting vehicles, it will be apparent that the invention has broader application in other mobile equipment, for example in utility service vehicles such as telephone and power company service vehicles having "cherry-pickers" or the like.

DETAILED DESCRIPTION OF THE INVENTION

Figure 1:
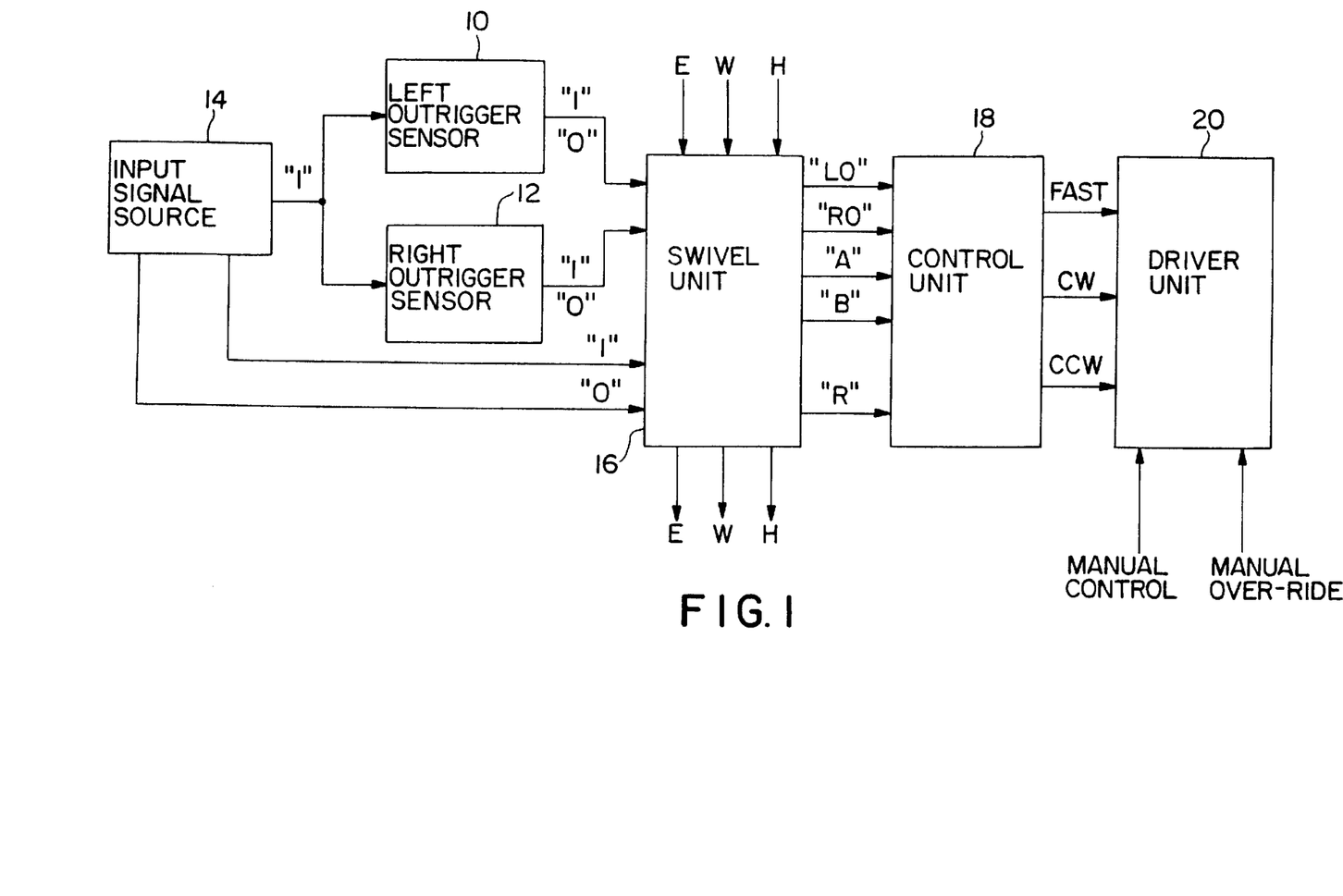
FIG. 1 is a block diagram of apparatus for controlling the rotational movement of a ladder of a vehicle having extendable outriggers at the lateral sides of the vehicle constructed in accordance with the present invention.

Referring to FIG. 1, apparatus for controlling the rotational movement of a ladder of a vehicle having extendable outriggers at the lateral sides of the vehicle, constructed in accordance with the present invention, includes sensing means responsive to movement of the outriggers for developing outrigger signals representative of full deployment of the outriggers. Such sensing means are represented by LEFT OUTRIGGER SENSOR 10 and RIGHT OUTRIGGER SENSOR 12 and can be the usual sensors mounted on a fire fighting vehicle in the usual manner. An input signal "1" is delivered from INPUT SIGNAL SOURCE 14 to LEFT OUTRIGGER SENSOR 10 and RIGHT OUTRIGGER SENSOR 12 from which LEFT OUTRIGGER SENSOR 10 and RIGHT OUTRIGGER SENSOR 12 develop output signals representative of full deployment of the outriggers. "1" at the outputs of LEFT OUTRIGGER SENSOR 10 and RIGHT OUTRIGGER SENSOR 12 represents these output signals. "0" at either output of LEFT OUTRIGGER SENSOR 10 and RIGHT OUTRIGGER SENSOR 12 represents no deployment or less than full deployment of the particular outrigger. In an alternative embodiment, an INPUT SIGNAL CONDITIONER 14 may be used in conjunction with the input signals.

Figure 2:
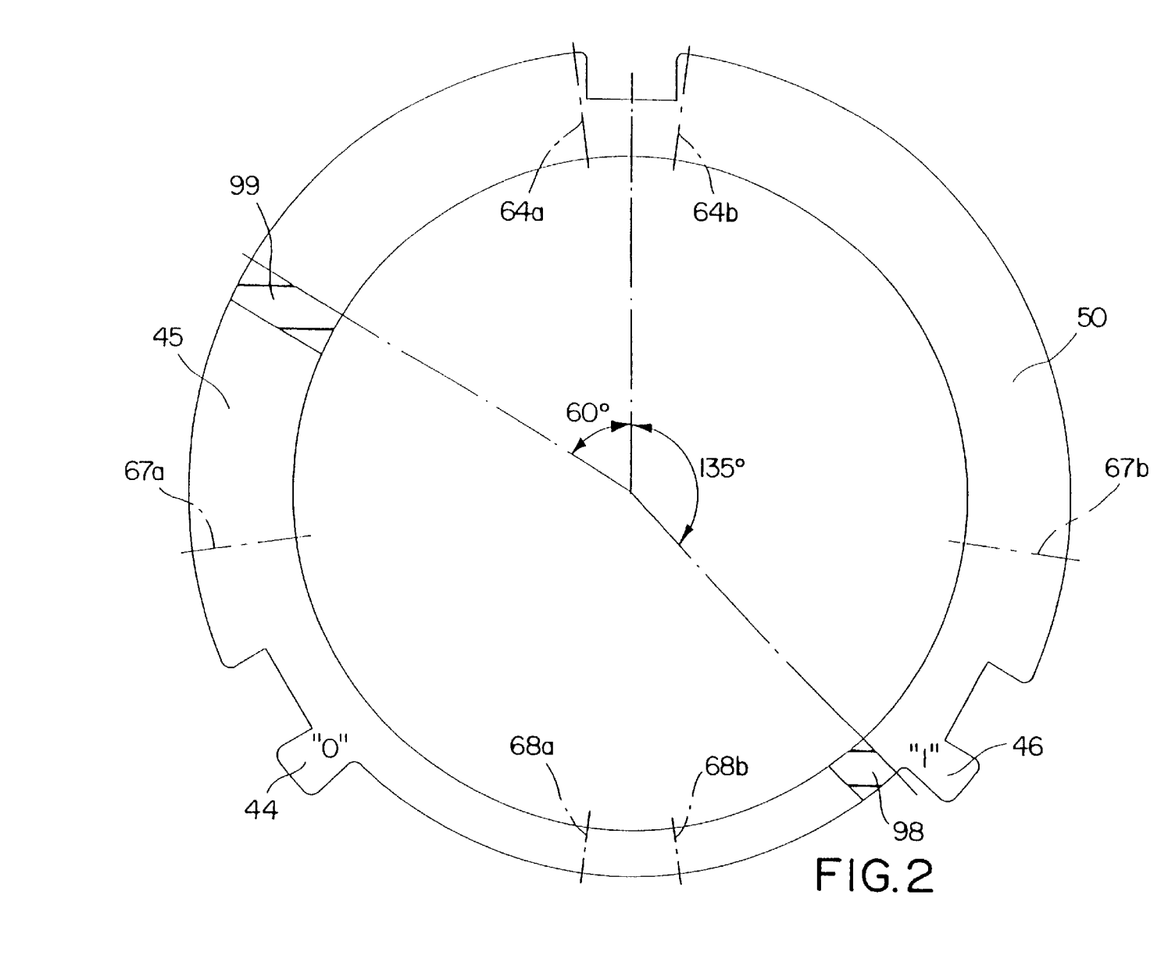
FIGS. 2 and 3 are plan views of the switching members of a position sensor unit constructed in accordance with the present invention.
Figure 3:
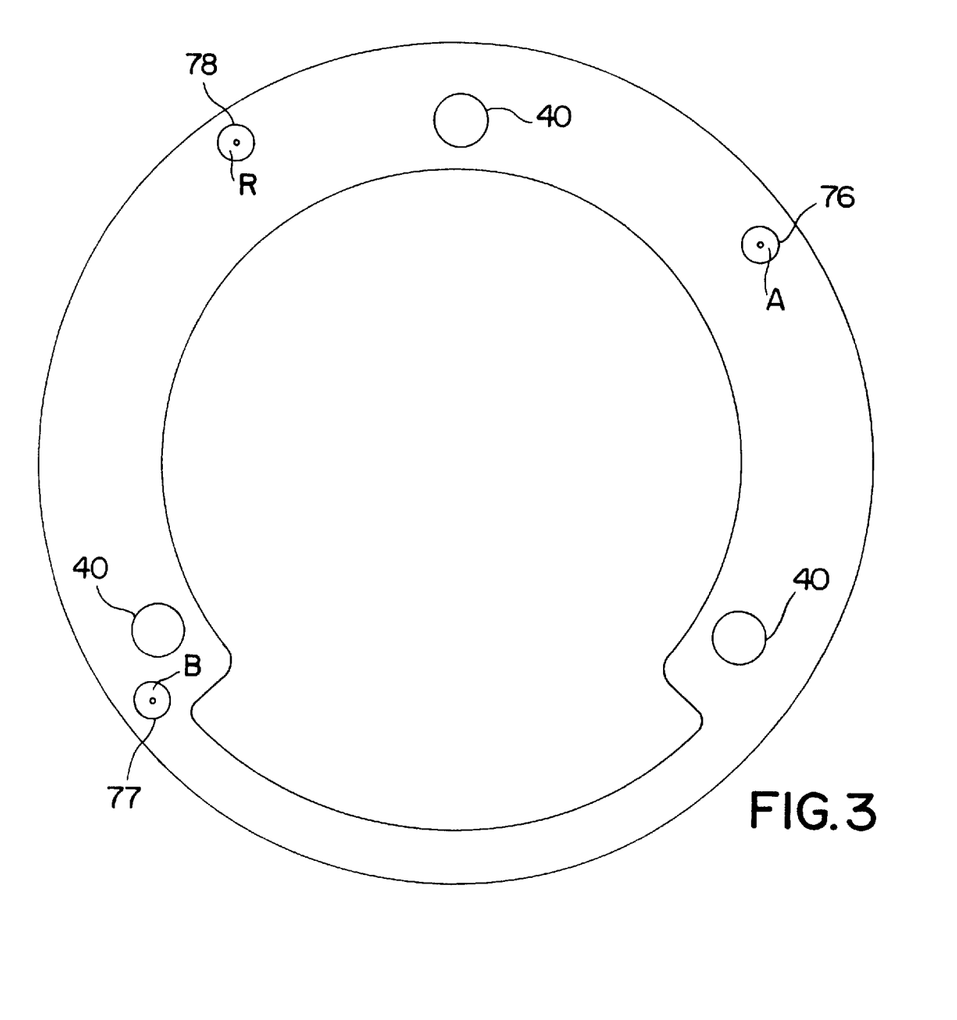
Figure 4:
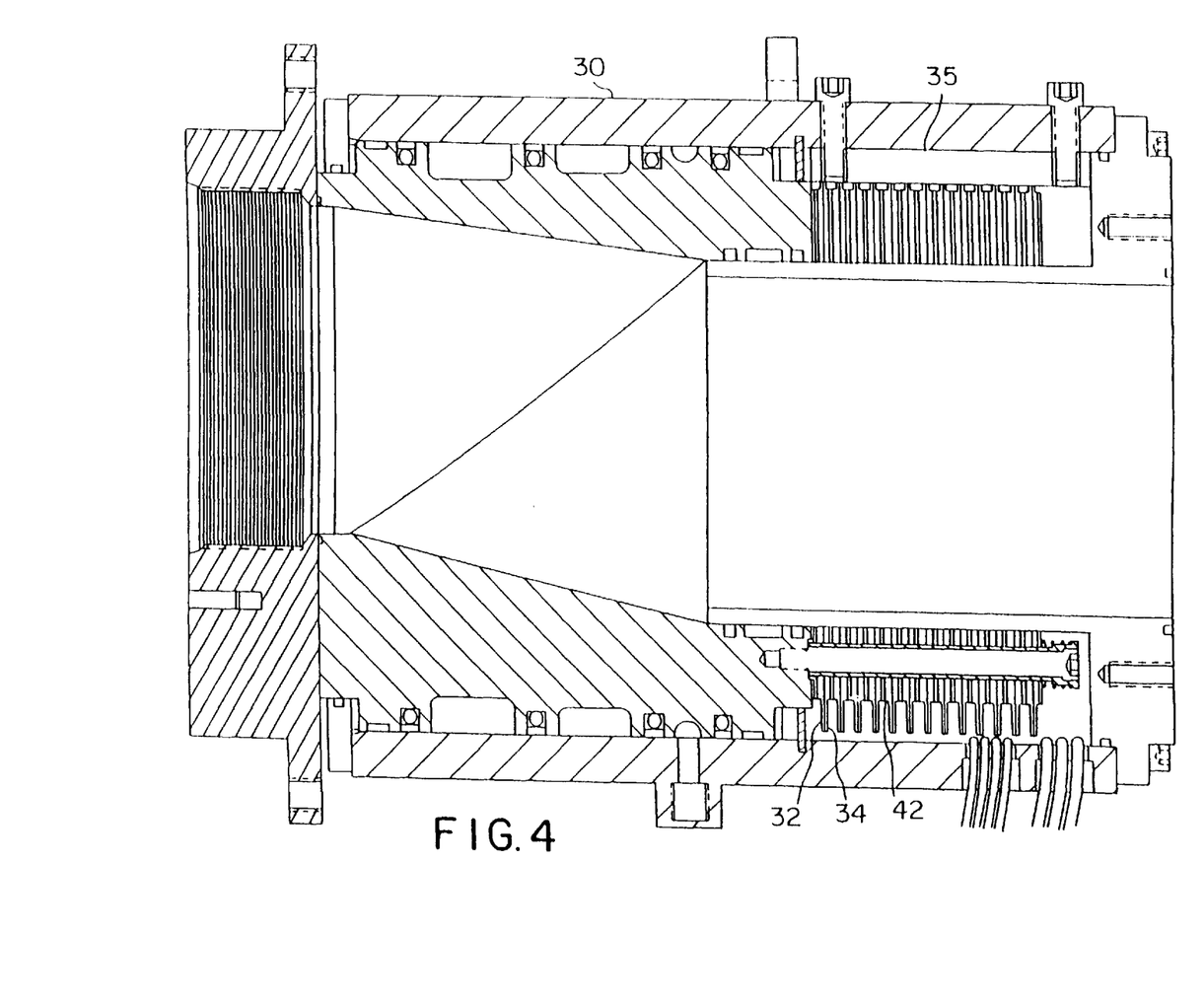
FIG. 4 is sectional view of a swivel unit housing which contains the switching members of FIGS. 2 and 3 in accordance with the present invention.

The FIG. 1 apparatus also includes a rotation position sensor unit, identified as SWIVEL UNIT 16, which is illustrated in FIGS. 2, 3 and 4 and described in detail below. SWIVEL UNIT 16 receives either the output signals "1", representative of full deployment of the outriggers, from LEFT OUTRIGGER SENSOR 10 and RIGHT OUTRIGGER SENSOR 12 or the output signals "0", representative of no deployment or less than full deployment of the outriggers, from LEFT OUTRIGGER SENSOR 10 and RIGHT OUTRIGGER SENSOR 12 and passes these signals, identified as "LO" and "RO", through to a CONTROL UNIT 18.

SWIVEL UNIT 16 also receives input signals "1" and "0" from INPUT SIGNAL SOURCE 14 from which: (1) first output signals are developed for a first range of rotational positions of the ladder, and (2) second output signals are developed for a second range of rotational positions, extending beyond the first range of rotational positions, of the ladder. The first output signals and second output signals delivered by SWIVEL UNIT 16 are various combinations of the signals identified as "A", "B", and "R" which will be explained in greater detail below.

CONTROL UNIT 18, responsive to the outrigger signals "LO", and "RO" and the output signals "A", "B", and "R" delivered from SWIVEL UNIT 16, supplies control signals to a DRIVER UNIT 20, typically one or more electrically operated hydraulic valves, which causes controlled rotation of the ladder. These control signals are represented by: (1) "FAST" which allows fast rotational movement of the ladder, (2) "CW" which allows clockwise rotational movement of the ladder, and (3) "CCW" which allows counterclockwise rotational movement of the ladder. MANUAL CONTROL, namely steering of the ladder by an operator while the present invention is operative, and MANUAL OVER-RIDE, namely complete control of the ladder by the operator after the present invention has been overridden, also are inputs to DRIVER UNIT 20.

"E", "W" and "H" in FIG. 1 represent electrical, water and hydraulic lines which extend through SWIVEL UNIT 16 from the body of the fire fighting vehicle to the top of the ladder or carriage at the top of the ladder. Electrical lines are provided for lighting at the carriage, communications between an operator in the carriage and others and power for operating tools from the carriage. Water lines are provided to apply water to the fire from the carriage. Hydraulic lines are provided to control movement of the carriage and ladder from the carriage.

Referring to FIGS. 2, 3 and 4, SWIVEL UNIT 16 of FIG. 1, which serves as a rotation position sensor unit, includes a housing 30 adapted to be fixed to the body of a fire fighting vehicle. The SWIVEL UNIT includes first and second switch members 32 and 34 mounted in housing 30 for relative rotation between first switch member 32 and second switch member 34. For the embodiment of the invention illustrated, switch member 32 is restrained from rotational movement by three ribs 35, only one of which is shown in FIG. 4, extending along the length of housing 30 which engage three notches 38 in the outer periphery of switch member 32. Switch member 34 has three holes 40 through which three elongated rods 42 extend, only one of which is shown in FIG. 4. These rods are fastened to the ladder, so that when the ladder is rotated, switch member 34 rotates relative to switch member 32.

As indicated above, input signals "1" and "0" are supplied to the SWIVEL UNIT from INPUT SIGNAL SOURCE 14. Specifically, input signal "1" is conducted to a tab 46 on switch member 32 and input signal "0" is conducted to a tab 44 on switch member 32. SWIVEL UNIT 16 develops and delivers first output signals for a first range of rotational positions of second switch member 34 relative to first switch member 32, and second output signals for a second range of rotational positions, extending beyond the first range of rotational positions, of the second switch member relative to the first switch member.

Switch member 32 is a multi-segment ring having a first electrically conductive segment 45 extending over a first arc length and to which input signal "0" is supplied by way of tab 44 and a second electrically conductive segment 50 extending over a second arc length and to which input signal "1" is supplied by way of tab 46. First electrically conductive segment 45 is electrically isolated from second electrically conductive segment 50 by insulator segments 98 and 99.

Switch member 34 is a ring from which the output signals "A", "B", and "R" of FIG. 1 are delivered. Switch member 34 has first electrical contact 76 (output signal "A"), second electrical contact 77 (output signal "B"), and third electrical contact 78 (output signal "R"), which are electrically isolated from each other.

First and second electrical contacts 76 ("A" output signal) and 77 ("B" output signal) are positioned on second ring 34 for:

(1) contact of first electrical contact 76 ("A" output signal) with second electrically conductive segment 50 of first multi-segment ring 32 and contact of second electrical contact 77 ("B" output signal) with the second electrically conductive segment 50 of the first multi-segment ring for the first range 64a–64b of rotational positions of second ring 34 relative to the first multi-segment ring 32, (2) contact of first electrical contact 76 ("A" output signal) with first electrically conductive segment 45 of first multi-segment ring 32 and contact of second electrical contact 77 ("B" output signal) with the second electrically conductive segment 50 of the first multi-segment ring for the second range of rotational positions of second ring 34 relative to the first multi-segment ring 32, extending beyond the first range of rotational positions.

Third electrical contact 78 ("R" output signal) is positioned on second ring 34 for:

(1) contact of third electrical contact 78 ("R" output signal") with second electrically conductive segment 50 of the first multi-segment ring for a first range, identified by dashed lines 64a– 64b, of rotational positions of second ring 34 relative to the first multi-segment ring 32, and (2) contact of third electrical contact 78 ("R" output signal) with second electrically conductive segment 50 of the first multi-segment ring for a second range of rotational positions, extending beyond the first range of rotational positions, of the second ring 34 relative to the first multi-segment ring 32, and The rotation range 64a–64b is the "cradle range." Within this narrow range, the ladder can be moved safely, either clockwise or counter-clockwise at slow speed, even if one or both outriggers are not fully deployed. This permits the secure seating of the ladder before travel even after the outriggers are retracted.

Similar statements can be made about the contacts of electrical contacts 76, 77, and 78 with electrically conductive segments 45 and 50 of multi-segment ring 32 for changes in the rotational position of second ring 34 when the ladder is disposed in an opposite direction as represented by dashed lines 68a and 68b. The contacts of electrical contacts 76, 77, and 78 with electrically conductive segments 45 and 50 of multi-segment ring 32 for changes in the rotational position of second ring 34 are identified below in four "truth" charts.

The following chart shows the dispositions of electrical contacts 76, 77, and 78 of switch member 34 relative to the segments 45, 50, 98, and 99 of switch member 32 for different rotational positions of switch member 34 moving counter-clockwise from the center line of rotation range 64a–64b:

| RANGE | First 76 CONTACT A | Second 77 CONTACT B | Third 78 CONTACT R |
|---|---|---|---|
| C/L–64a | 50 | 50 | 50 |
| +64a | 45 | 50 | 50 |

A similar chart can be developed for clockwise movement of switch member 34 from the center line of rotation range 64a–64b. Specifically:

| RANGE | First 76 CONTACT A | Second 77 CONTACT B | Third 78 CONTACT R |
|---|---|---|---|
| C/L–64b | 50 | 50 | 50 |
| +64b | 50 | 45 | 50 |

If the foregoing is taken for rotations of switch member 34 for the ladder disposed toward the front of the fire fighting vehicle, the following chart shows the dispositions of electrical contacts 76, 77, and 78 of switch member 34 relative to the segments 45, 50, 98, and 99 of switch member 32 for different rotational positions of switch member 34, moving counter-clockwise from the center line of rotation range 68a–68b, for disposition of the ladder toward the rear of the fire fighting vehicle:

| RANGE | First 76 CONTACT A | Second 77 CONTACT B | Third 78 CONTACT R |
|---|---|---|---|
| C/L–68b | 50 | 50 | 45 |
| +68b | 50 | 45 | 45 |

A similar chart can be developed for clockwise movement of switch member 34 from the center line of rotation range 68a–68b. Specifically:

| RANGE | First 76 CONTACT A | Second 77 CONTACT B | Third 78 CONTACT R |
|---|---|---|---|
| C/L–68a | 50 | 50 | 45 |
| +68a | 45 | 50 | 45 |

The logic circuitry in CONTROL UNIT 18 is set to recognize and distinguish between the different combinations of outputs from SWIVEL UNIT 16 as representing the ladder being in a particular rotational position. Based on the determination of the rotational position of the ladder, along with the outrigger sensor signals "LO" and "RO", CONTROL UNIT 18 develops the appropriate control signals. For example:

(1) Any signal from SWIVEL UNIT 16 that is a "0" (i.e. contact with electrically conductive segment 45 of multi-segment ring 32) or neither "0" nor "1" (i.e. contact with isolated segment 98 or isolated segment 99 of multi-segment ring 32) is evaluated by CONTROL UNIT 18 as a "0"; and (2) Any signal from SWIVEL UNIT 16 that is a "1" (i.e. contact with electrically conductive segment 50 of multi-segment ring 32) is evaluated by CONTROL UNIT 18 as a "1".

It will be useful, in gaining a understanding of the operation of the present invention, to give an example of a possible maneuver of the ladder. With both outriggers fully deployed, the present invention does not become operative.

Assume that the left outrigger is fully deployed and the right outrigger is less than fully deployed and the ladder is disposed toward the front of the fire fighting vehicle. The right outrigger sensor signal "RO" conditions CONTROL UNIT 18 to make the present invention effective if the operator steers the ladder to the right or clockwise for the viewing of FIGS. 2 and 3.

The following "truth" table applies for a right outrigger signal RO="0" and a left outrigger signal LO="1":

|  | RAW SWIVEL SIGNALS | | | EVALUATED SIGNALS | | |
| --- | --- | --- | --- | --- | --- | --- |
| Range | 76 A | 77 B | 78 R | 76 A | 77 B | 78 R |
| 67b–64b | 1 | X | 1 | 1 | 0 | 1 |
| 64b–64a | 1 | 1 | 1 | 1 | 1 | 1 |
| 64a–67a | X | 1 | 1 | 0 | 1 | 1 |
| 67a–68a | X | 1 | X | 0 | 1 | 0 |
| 68a–68b | 1 | 1 | X | 1 | 1 | 0 |
| 68b–67b | 1 | X | X | 1 | 0 | 0 | where: "X" may be either "0" or neither; "neither" meaning no value, namely a contact being on a non-conducting segment 98 or 99.

If the operator steers the ladder clockwise, namely toward the right side where the outrigger is not fully deployed, CONTROL UNIT 18 supplies an output signal "CW" and the ladder is allowed to move slowly to one end 64b of range 64a–64b and no further. Clockwise movement of the ladder is limited because CONTROL UNIT 18 recognizes from the "RO" and "A", "B", and "R" signals that the right outrigger is not fully deployed and the ladder is at the end 64b of range 64a–64b. At this point, the operator has two options if the ladder is to be further moved clockwise. One option is to fully deploy the right outrigger if possible. The second option is to consciously over-ride the present invention by actuating the manual over-ride switch and steer the ladder further clockwise.

If, instead of steering the ladder clockwise, the operator steers the ladder counter-clockwise, namely toward the left side where the outrigger is fully deployed, CONTROL UNIT 18 supplies two output signals "SLOW" and "CCW" and the ladder is allowed to move slowly to end 64a of range 64a–64b. From this point, CONTROL UNIT 18 supplies two output signals "FAST" and "CCW" and the ladder is allowed to move quickly to end 68a of range 68a–68b. From this point, the "CCW" output signal from CONTROL UNIT 18 allows the ladder to continue to move counter-clockwise, but the "SLOW" output signal from the CONTROL UNIT allows rotation only at a slower rate because the right outrigger is not fully deployed. The ladder continues to move slowly until it reaches end 68b of this range but no further because CONTROL UNIT 18 recognizes from the "RO" and "A", "B", and "R" signals that the right outrigger is not fully deployed and the ladder is at the end 68b of range 68a–68b.

Those skilled in the art will recognize that other arrangements besides the conductive segment/electrical contact arrangement can be used to develop signals indicative of the position of second switch member 34 relative to first switch member 32. For example, potentiometers, encoders and optical sensors can be used and, while generally similar to the conductive segment/electrical contact arrangement described above, will require different signal processing circuitry.

As is evident from FIG. 2 first switch member 32 has a circular inner periphery and an outer periphery having a first outside diameter extending along a third arc length and a second outside diameter, less than the first outside diameter, extending along a fourth arc length. As is evident from FIG. 3, second switch member 34 has a circular outer periphery with a diameter equal to the second outside diameter of first switch member 34 and an inner periphery having a first inside diameter equal to the inside diameter of the first switch member extending along a fifth arc length and a second inside diameter, less than the inside diameter of the first switch member extending along a sixth arc length. With this arrangement, electrical wires can extend through SWIVEL UNIT 16 nestled in the sector of reduced outside diameter of switch member 32 and in the sector of increased inside diameter of switch member 34. In addition, water and hydraulic lines can extend through the central openings in switch members 32 and 34.

While there have been described preferred embodiments of the present invention, it should be obvious to those skilled in the art that various modifications and changes can be made without departing from the true spirit and scope of the invention.

What is claimed:

1. A rotation position sensor unit comprising:

a first multi-segment ring having:
 (a) a first electrically conductive segment extending over a first arc length and to which a first input signal is supplied, and
 (b) a second electrically conductive segment extending over a second arc length and to which a second input signal is supplied, said first electrically conductive segment electrically isolated from said second electrically conductive segment;

a second ring having no more than three electrical contacts electrically isolated from each other and from which output signals are delivered:
 (a) first and second electrical contacts positioned on said second ring for:
  (1) contact of said first electrical contact with said second electrically conductive segment of said first multi-segment ring and contact of said second electrical contact with said second electrically conductive segment of said first multi-segment ring for a first range of rotational positions of said second ring relative to said first multi-segment ring, and
  (2) contact of said first electrical contact with said first electrically conductive segment of said first multi-segment ring and contact of said second electrical contact with said second electrically conductive segment of said first multi-segment ring for a second range of rotational positions, extending beyond said first range of rotational positions, of said second ring relative to said first multi-segment ring, and
 (b) a third electrical contact positioned on said second ring for:
  (1) contact of said third electrical contact with said second electrically conductive segment of said first multi-segment ring for said first range of rotational positions of said second ring relative to said first multi-segment ring, and
  (2) contact of said third electrical contact with said second electrically conductive segment of said first multi-segment ring for said second range of rotational positions of said second ring relative to said first multi-segment ring; and means for mounting said first multi-segment ring and said second ring for relative rotation between said first multi-segment ring and said second ring.

2. A rotation position sensor unit according to claim 1 wherein:
 (a) said first multi-segment ring has:
  (1) a circular inner periphery, and
  (2) an outer periphery having:
   (i) a first outside diameter extending along a third arc length, and (ii) a second outside diameter, less than said first outside diameter, extending along a fourth arc length;
(b) said second ring has:
(1) a circular outer periphery with a diameter equal to said second outside diameter of said first multi-segment ring, and
(2) an inner periphery having:
(i) a first inside diameter equal to said inside diameter of said first multi-segment ring extending along a fifth arc length, and
(ii) a second inside diameter less than said inside diameter of said first multi-segment ring extending along a sixth arc length.

3. Apparatus for controlling the rotational movement of a swingable unit of a mobile equipment vehicle having extendible outriggers at the lateral sides of the vehicle, said apparatus comprising:
sensing means responsive to movement of the outriggers for developing outrigger signals representative of full deployment of the outriggers;
a swivel unit, including a first switch member having no more than two electrically conductive segments and a second switch member having no more than three electrical contacts, said first and second switch members mounted for relative rotation between said first switch member and said second switch member, to which input signals are supplied and from which:
(1) first output signals are delivered for a first range of rotational positions of said second switch member relative to said first switch member; and
(2) second output signals are delivered for a second range of rotational positions, extending beyond said first range of rotational positions, of said second switch member relative to said first switch member; and
a control unit responsive to said outrigger signals and said output signals delivered from said swivel unit for supplying control signals to a driver unit which allows rotation of the swingable unit.

4. Apparatus according to claim 3 wherein said swivel unit further includes a housing within which said first switch member and said second switch member are mounted with one of said switch members restrained from rotation relative to said housing and:
(a) said housing is adapted for attachment to the body of the vehicle, and
(b) said other switch member is adapted for attachment the ladder.

5. Apparatus according to claim 3 wherein the swingable unit is a ladder and said first switch member is attached to the mobile equipment vehicle and said second switch member is attached to said ladder.

6. Apparatus according to claim 3 wherein said control unit includes logic means for developing, from the output signals from said swivel unit, control signals which are uniquely related to relative rotational positions of said first and said second switch members.

7. Apparatus according to claim 6 wherein said logic means recognize those output signals from said swivel unit which can result in control signals which are false indications of the relative rotational positions of said first and said second switch members and apply rules to treatment of those output signals from said swivel unit which can result in control signals which are false indications of the relative rotational positions of said first and said second switch members.

8. Apparatus for controlling the rotational movement of a swingable unit of a mobile equipment vehicle having extendible outriggers at the lateral sides of the vehicle, said apparatus comprising:
sensing means responsive to movement of the outriggers for developing outrigger signals representative of full deployment of the outriggers;
a rotation position sensor unit including:
(a) a housing,
(b) a first multi-segment ring having:
(1) a first electrically conductive segment extending over a first arc length and to which an input signal is supplied, and
(2) a second electrically conductive segment extending over a second arc length and to which an input signal is supplied,
said first electrically conductive segment electrically isolated from said second electrically conductive segment,
(c) a second electrically conductive ring from which output signals are delivered and having no more than three electrical contacts and including:
(1) first and second electrical contacts positioned on said second ring electrically isolated from each other for:
(i) contact of said first electrical contact with said second electrically conductive segment of said first multi-segment ring and contact of said second electrical contact with said second electrically conductive segment of said first multi-segment ring for a first range of rotational positions of said second ring relative to said first multi-segment ring, and
(ii) contact of said first electrical contact with said first electrically conductive segment of said first multi-segment ring and contact of said second electrical contact with said second electrically conductive segment of said first multi-segment ring for a second range of rotational positions, extending beyond said first range of rotational positions, of said second ring relative to said first multi-segment ring, and
(2) a third electrical contact positioned on said second ring electrically isolated from said first and said second electrical contacts for:
(i) contact of said third electrical contact with said second electrically conductive segment of said first multi-segment ring for said first range of rotational positions of said second ring relative to said first multi-segment ring, and
(ii) contact of said third electrical contact with said second electrically conductive segment of said first multi-segment ring for said second range of rotational positions of said second ring relative to said first multi-segment ring, and
(d) means for mounting said first multi-segment ring and said second ring in said housing for relative rotation between said first multi-segment ring and said second ring; and
a control unit responsive to said outrigger signals and said output signals delivered from second ring for supplying control signals to a driver unit which allows rotation of the swingable unit.

9. Apparatus according to claim 8 wherein one of said rings is restrained from rotational movement relative to said housing and:
(a) said housing is adapted for attachment to the body of the vehicle, and (b) said other ring is adapted for attachment to the swingable unit.

10. Apparatus according to claim 8 wherein the swingable unit is a ladder and said first multi-segment ring is attached to the mobile equipment vehicle and said second electrically conductive ring is attached to said ladder.

11. Apparatus according to claim 10 wherein said control unit supplies:
   (a) a first control signal which allows fast rotational movement of the ladder,
   (b) a second control signal which allows clockwise rotational movement of the ladder, and
   (c) a third control signal which allows counter-clockwise rotational movement of the ladder.

12. Apparatus according to claim 11 wherein:
   (a) said first multi-segment ring has:
      (1) a circular inner periphery, and
      (2) an outer periphery having:
         (i) a first outside diameter extending along a third arc length, and
         (ii) a second outside diameter, less than said first outside diameter, extending along a fourth arc length; and
   (b) a second ring has:
      (1) a circular outer periphery with a diameter equal to said second outside diameter of said first multi-segment ring, and
      (2) an inner periphery having:
         (i) a first inside diameter equal to said inside diameter of said first multi-segment ring extending along a fifth arc length, and
         (ii) a second inside diameter less than said inside diameter of said first multi-segment ring extending along a sixth arc length.

13. Apparatus for controlling the rotational movement of a swingable unit of a mobile equipment vehicle, said apparatus comprising:
   a swivel unit, including a first switch member having no more than two electrically conductive segments and a second switch member having no more than three electrical contacts, said first and second switch member mounted for relative rotation between said first switch member and said second switch member, from which output signals are delivered for indicating rotational positions of said second switch member relative to said first switch member; and
   a control unit responsive to said output signals delivered from said swivel unit for supplying control signals to a driver unit which allows rotation of the swingable unit, said control unit including logic means for developing, from the output signals from said swivel unit, control signals which are uniquely related to relative rotational positions of said first and said second switch members, thereby preventing a false indication of the relative rotational positions of said first switch member and said second switch member, wherein:
   (a) the output signals from swivel unit, represent relative positions of said first and said second switch members, and
   (b) said logic means operates in accordance with a plurality of rules defined by:
      (1) any signal from said swivel unit that is initially a "0" or neither "0" nor "1" is interpreted as a "0," and
      (2) any signal from said swivel unit that is a "1" is interpreted as a "1";
   in order to prevent a false indication of the relative rotational positions of said first switch member and said second switch member.

14. Apparatus for controlling the rotational movement of a swingable unit of a mobile equipment vehicle having extendible outriggers at the lateral sides of the vehicle, said apparatus comprising:
   sensing means responsive to movement of the outriggers for developing outrigger signals representative of full deployment of the outriggers;
   a swivel unit, including a first switch member having no more than two electrically conductive segments and a second switch member having no more than three electrical contacts, said first and second switch members mounted for relative rotation between said first switch member and said second switch member, to which input signals are supplied and from which:
      (1) first output signals are delivered for a first range of rotational positions of said second switch member relative to said first switch member; and
      (2) second output signals are delivered for a second range of rotational positions, extending beyond both ends of said first range of rotational positions, of said second switch member relative to said first switch member; and
   a control unit responsive to said outrigger signals and said output signals delivered from said swivel unit for supplying control signals to a driver unit which allows rotation of the swingable unit.

* * * * *